(12) United States Patent
Farmer et al.

(10) Patent No.: US 8,364,558 B2
(45) Date of Patent: *Jan. 29, 2013

(54) METHODS AND SYSTEMS FOR ACCESSING INFORMATION RELATED TO AN ORDER OF A COMMODITY

(75) Inventors: James G. Farmer, Nyssa, OR (US); Charles W. Farmer, Nyssa, OR (US); Joseph S. Farmer, Nyssa, OR (US)

(73) Assignee: Trace Produce, LLC, Nyssa, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/353,259

(22) Filed: Jan. 18, 2012

(65) Prior Publication Data

US 2012/0259789 A1 Oct. 11, 2012

Related U.S. Application Data

(63) Continuation of application No. 11/363,785, filed on Feb. 27, 2006, now Pat. No. 8,131,599.

(51) Int. Cl.
*G06Q 30/00* (2012.01)
(52) U.S. Cl. .................................... 705/26.61
(58) Field of Classification Search ................ 705/26.61
See application file for complete search history.

(56) References Cited

U.S. PATENT DOCUMENTS

| | | | |
|---|---|---|---|
| 5,478,990 A | 12/1995 | Montanari et al. | |
| 5,503,859 A | 4/1996 | Creason | |
| 5,913,210 A | 6/1999 | Call | |
| 6,220,509 B1 * | 4/2001 | Byford | 235/375 |
| 6,545,604 B1 | 4/2003 | Dando et al. | |
| 6,963,881 B2 | 11/2005 | Pickett et al. | |
| 7,183,923 B2 | 2/2007 | Sasaki et al. | |
| 7,681,527 B2 | 3/2010 | Pratt | |
| 7,689,465 B1 | 3/2010 | Shakes et al. | |
| 2001/0011437 A1 | 8/2001 | Shortridge et al. | |
| 2001/0032161 A1 | 10/2001 | Thomas et al. | |
| 2001/0049634 A1 | 12/2001 | Stewart | |
| 2003/0009254 A1 | 1/2003 | Carlson et al. | |
| 2003/0069772 A1 | 4/2003 | Roberts et al. | |
| 2004/0083201 A1 | 4/2004 | Sholl et al. | |
| 2004/0122733 A1 | 6/2004 | Hanschen et al. | |
| 2004/0177011 A1 | 9/2004 | Ramsey et al. | |

(Continued)

FOREIGN PATENT DOCUMENTS

JP 2002-297625 10/2002
KR 10-2004-0110912 12/2004

(Continued)

OTHER PUBLICATIONS

"John Deere Partners with Vantagepoint Network and Cropverifeye. Com, LLC to Introduce the New CropTracer(TM) System" PR Newswire; Feb. 26, 2011.*

(Continued)

*Primary Examiner* — John Hayes
*Assistant Examiner* — Allen J Jung
(74) *Attorney, Agent, or Firm* — Holland & Hart LLP

(57) ABSTRACT

Methods of allowing a customer to access information related to an order of a commodity include entering the information into a central database, updating a content of a web-based application with the information within the central database, and allowing the customer to access the information via the web-based application. Systems for allowing a customer to access information related to an order of a commodity include a server configured to store the information in a central database, one or more terminals having one or more applications configured to enter the information into the central database, and a web-based application configured to allow the customer to access the information within the central database.

19 Claims, 12 Drawing Sheets

U.S. PATENT DOCUMENTS

| | | |
|---|---|---|
| 2005/0051109 A1 | 3/2005 | Fantin et al. |
| 2005/0075900 A1 | 4/2005 | Arguimbau, III |
| 2005/0086132 A1 | 4/2005 | Kanitz et al. |
| 2005/0246752 A1 | 11/2005 | Liwerant et al. |
| 2007/0118739 A1 | 5/2007 | Togashi et al. |
| 2007/0156544 A1 | 7/2007 | Meyer et al. |
| 2007/0203724 A1 | 8/2007 | Farmer et al. |
| 2007/0203818 A1 | 8/2007 | Farmer et al. |
| 2008/0021740 A1 | 1/2008 | Beane et al. |
| 2008/0065473 A1 | 3/2008 | Stroman et al. |
| 2008/0262923 A1 | 10/2008 | Farmer et al. |
| 2008/0300984 A1 | 12/2008 | Li |
| 2009/0254460 A1 | 10/2009 | Farmer et al. |
| 2010/0106660 A1 | 4/2010 | Farmer et al. |

FOREIGN PATENT DOCUMENTS

| | | |
|---|---|---|
| WO | 2005-002747 | 1/2005 |
| WO | 2005-022303 | 3/2005 |

OTHER PUBLICATIONS

International Search Report dated Nov. 20, 2009, for International Application No. PCT/US2009/039533 ( 3 pgs.).

Anon., "Safety Net: In Light of a Recent Spike in Discoveries of Foodborne Contamination, Preventing Such Events at All Points in the Food Supply Chain Has Become More Important Than Ever," Progressive Grocer, vol. 83, No. 6, p. 67, Apr. 15, 2004.

Anon., "John Deere Partners with Vantagepoint Network and Cropverifeye.com LLC to Introduce the New CroptracerTM System," PR Newswire, Feb. 26, 2001.

Clemens, R., "Meat Traceability in Japan," Iowa Ag Review, Fall 2003, vol. 9, No. 4.

International Search Report, dated Mar. 4, 2010, for International Application No. PCT/US2009/061095 (1 pg.).

* cited by examiner

METHODS AND SYSTEMS FOR ACCESSING INFORMATION RELATED TO AN ORDER OF A COMMODITY

RELATED APPLICATIONS

The present application is a continuation application of U.S. patent application Ser. No. 11/363,785, filed 27 Feb. 2006, titled "Methods and Systems for Accessing Information Related to an order of a Commodity," which application is incorporated herein by reference in its entirety.

BACKGROUND

The ability to trace produce back to its packing facilities, inspection points, and even the field in which it was grown is becoming more of a necessity in the produce industry as concerns regarding food safety increase. In the event of a food-borne illness outbreak, for example, damage may be limited if the source of the contaminated product is identified quickly so that other products grown in the same field, processed in the same packing facility, or transported in the same vehicle can be quarantined.

The events of Sep. 11, 2001 reinforced the need to enhance the security of the United States. They also raised awareness of the possibility of bioterrorism attacks. Hence, Congress passed the Public Health Security and Bioterrorism Preparedness and Response Act of 2002 (the Bioterrorism Act), which requires food handlers to establish and maintain records for all food directly in contact with its finished container.

In addition, many customers, such as brokers and retailers, are increasingly requesting real time access to information regarding the produce they buy. For example, they often desire to view shipping, tracing, and inspection information immediately after they place an order for produce. Many customers also require independent certification audits of all produce sold in their stores.

Currently, much of the shipping, tracing, and inspection information is recorded on paper. Moreover, a myriad of different recording techniques are used to record this information. Consequently, it is often difficult to comply with government requirements to be able to trace produce back to the packing facility in which it was processed and to the field in which it was grown. It is also difficult to comply with customers' requests to instantaneously access information regarding their produce orders.

SUMMARY

Methods of allowing a customer to access information related to an order of a commodity include entering the information into a central database, updating a content of a web-based application with the information within the central database, and allowing the customer to access the information via the web-based application. The information may include sales information, shipping information, tracing information, and/or inspection information corresponding to the order of the commodity.

Systems for allowing a customer to access information related to an order of a commodity include a server configured to store the information in a central database, one or more terminals having one or more applications configured to enter the information into the central database, and a web-based application configured to allow the customer to access the information within the central database. The information may include sales information, shipping information, tracing information, and/or inspection information corresponding to the order of the commodity.

BRIEF DESCRIPTION OF THE DRAWINGS

The accompanying drawings illustrate various embodiments of the principles described herein and are a part of the specification. The illustrated embodiments are merely examples and do not limit the scope of the disclosure.

FIG. 4 is a screen shot of an exemplary software program that may be used by a packing facility worker to assign a tracking identification (ID) to an incoming lot of produce within a central database according to principles described herein.

FIG. 5 is a screen shot of an exemplary produce inspection software program that may be used by an inspector to enter an inspection report into the central database according to principles described herein.

FIG. 9 is a screen shot of a web page showing an exemplary inspection report summary according to principles described herein.

FIG. 10 is a screen shot of a web page showing an exemplary number of sales details corresponding to a selected order according to principles described herein.

Throughout the drawings, identical reference numbers designate similar, but not necessarily identical, elements.

DETAILED DESCRIPTION

Methods and systems for allowing a customer to access information related to an order of a commodity are described herein. The information may include sales information, shipping information, tracing information, and/or inspection information corresponding to the order of the commodity. In some examples, as will be described in more detail below, the information is entered into a central database via one or more applications residing on one or more terminals. A web-based application is regularly updated with the information within the central database. An authorized customer or other entity may then login to the web-based application and access the desired information related to the order of the commodity.

As used herein and in the appended claims, unless otherwise specifically denoted, the term "customer" will be used to refer to any authorized entity that logs into the web-based application and accesses information related to an order of commodity. Exemplary, but not exclusive, customers include, brokers, retailers, individual buyers, inspectors, shippers, growers, and others involved in the supply chain of the commodity.

It will be recognized that the systems and methods described herein may be applied to any type of commodity and are not limited to produce only. For example, the systems and methods described herein may be used to keep track of and access information regarding the production, processing, inspection, and/or shipment of any type of produce (e.g., fruits and vegetables), grain, meat, livestock, or other food product. However, for illustrative purposes only, produce will be used in the examples described herein.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
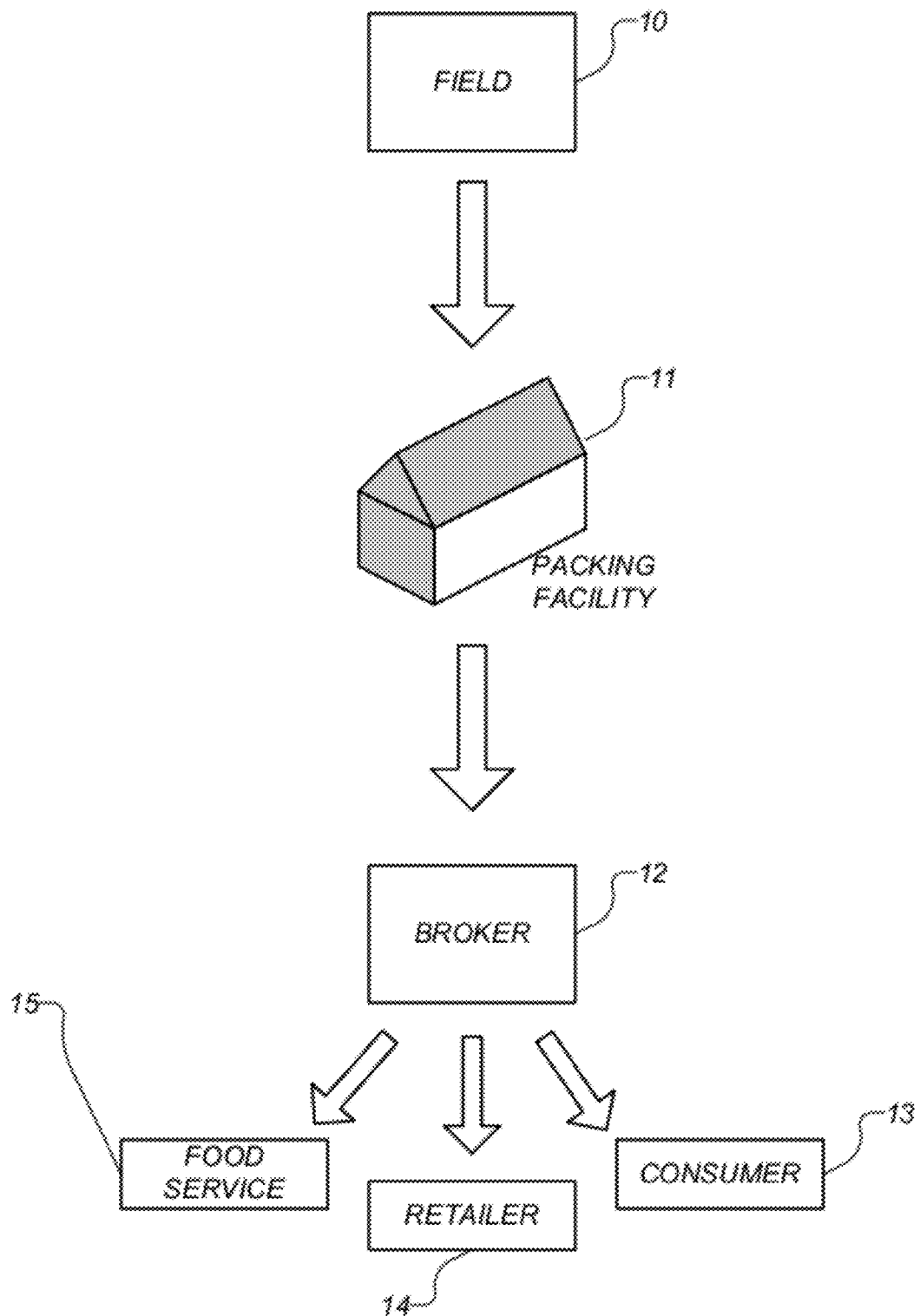
FIG. 1 illustrates an exemplary supply chain or path that produce may take in route to an end consumer according to principles described herein.

FIG. 1 illustrates an exemplary supply chain or path that produce may take in route to an end consumer. As shown in FIG. 1, the produce is first grown in a field (10) or in any other suitable environment. It is then harvested and taken to a packing facility (11) where it is processed and packed for shipment to various destinations. The packing facility (11) is also known as a packing shed or a packing house. In some alternative examples, harvested produce is first taken to a storage facility where it is stored for a period of time prior to being taken to the packing facility (11).

Packing facility operations may vary depending on the particular produce being processed. For example, packing facility operations may be as simple as moving produce from a field lug into a shipping container. Alternatively, packing facility operations may include a variety of handling practices including, but not limited to, cleaning, waxing, sizing, quality grading, color sorting, and inspecting.

Produce is often inspected at the packing facility (11) by a United States Department of Agriculture (USDA) inspector. Alternatively, many packing facilities (11) now participate in the USDA's Customer Assisted Inspection Program (CAIP). Under CAIP, a packing facility (11) hires its own internal inspector that has been certified by the state to inspect produce. The inspector's work is reviewed periodically by a USDA certified state inspector to ensure that inspection procedures are properly followed. The inspection procedure and other packing facility operations will be described in more detail below.

Once the produce has been processed in the packing facility (11) and packed, it is transported to various buyers. Produce is often bought by a broker (12), which, in turn, distributes the produce to various end consumers (13), retailers (14), or other food service entities (15). In some alternative arrangements, the packing facility (11) serves as a broker and distributes the produce directly to the customers.

As mentioned, produce buyers often desire access to information concerning the production, processing, inspection, and transportation of the produce that they purchase. This information includes, but is not limited to, load quantities, pricing, tracing information (i.e., information describing the grower of the produce and the particular field where the produce was grown), inspection report summaries, transport vehicle information, and images of the produce while still in the processing stage.

Figure 2:
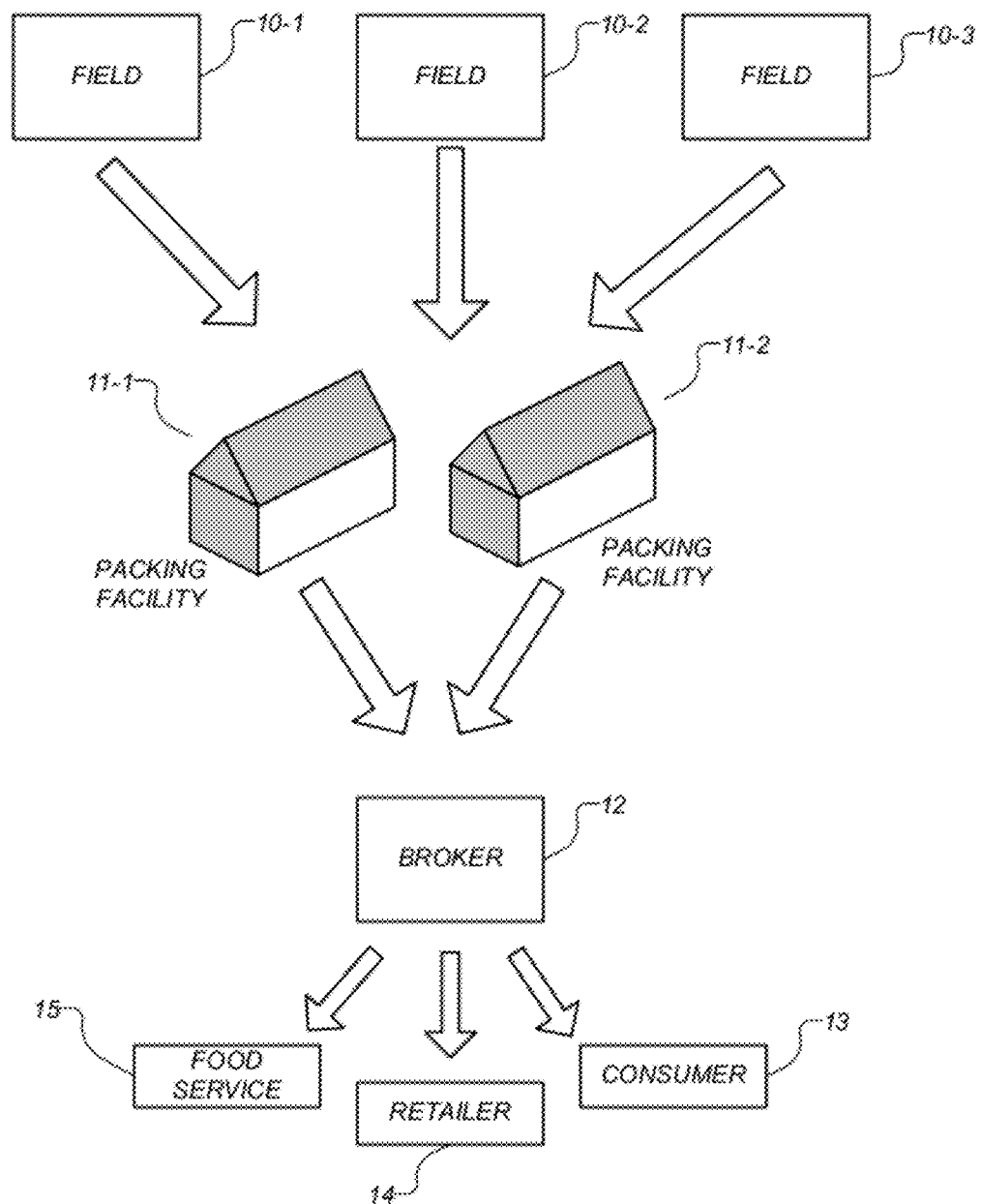
FIG. 2 illustrates multiple exemplary supply chains that produce may take in route to an end consumer according to principles described herein.

However, as shown in FIG. 2, a particular piece of produce that is sold to a broker (12) or a retailer (14), for example, may originate in one of many different fields (e.g., 10-1 through 10-3), be processed in one of many different packing facilities (e.g., 11-1, 11-2), and take one of many different transportation routes before it arrives at its final destination. Moreover, each packing facility (11) may use different recording, tracking, and inspection procedures. For these reasons, accessing desired information corresponding to produce once it is processed and shipped is often a difficult and lengthy process.

Hence, the systems and methods described herein may be used to standardize the recording procedures used by growers, packing facilities, inspectors, and shippers so that buyers may have real-time access to information related to the production, processing, inspection, and transportation of the produce that they purchase. As will be described in more detail below, a web-based application may be used to trace produce and to give produce buyers real-time access to information related to their purchase order.

Figure 3:
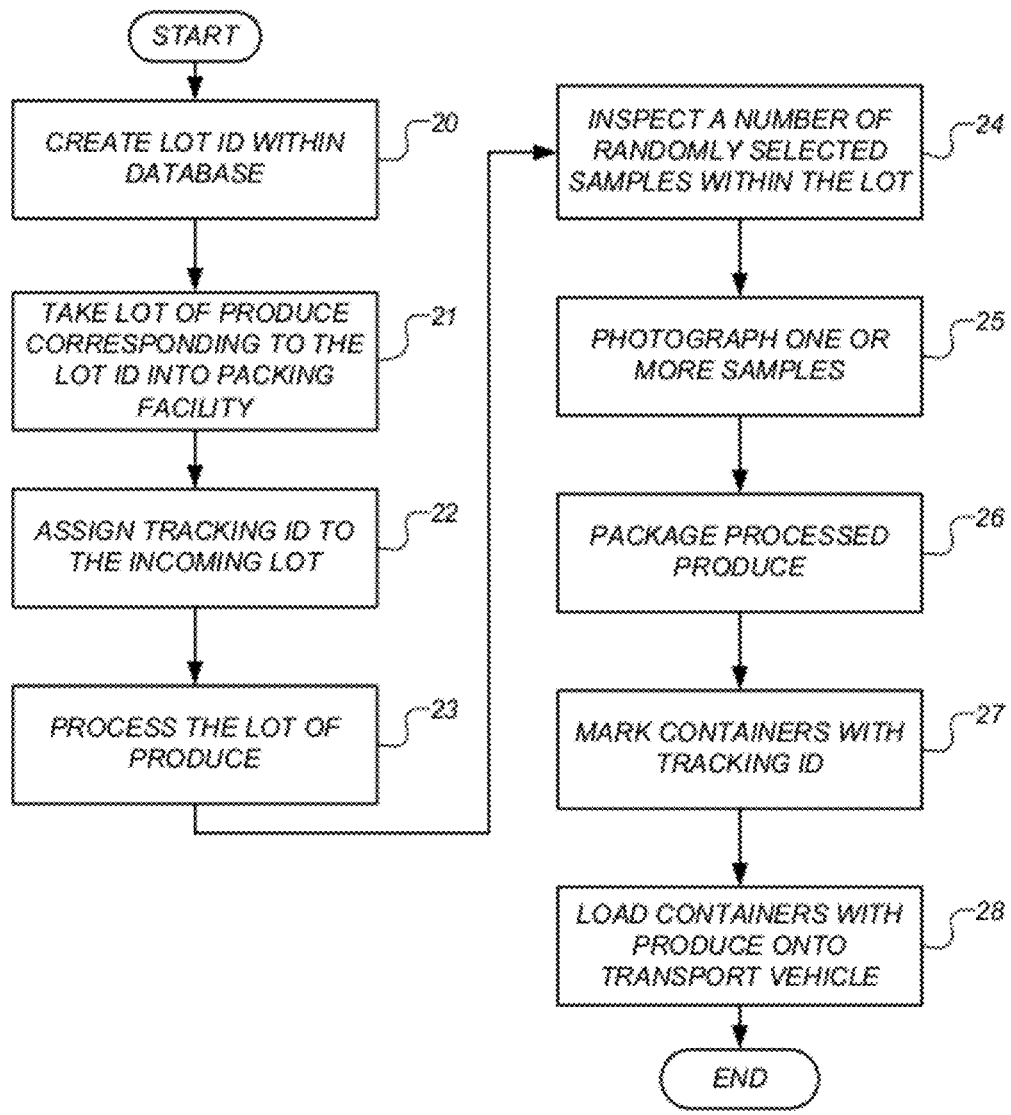
FIG. 3 is a flow chart illustrating an exemplary packing process that may be used within a packing facility to facilitate real-time access to processing, shipping, tracing, and inspection information corresponding to a lot of produce that is processed within the packing facility according to principles described herein.

FIG. 3 is a flow chart illustrating an exemplary packing process that may be used within a packing facility to facilitate real-time access to processing, shipping, tracing, and inspection information corresponding to a lot of produce that is processed within the packing facility. It will be recognized that the steps shown in FIG. 3 are merely exemplary and that they may be modified, reordered, added to, and/or removed as best serves a particular application. As shown in FIG. 3, a "lot identification" (lot ID) corresponding to a particular lot of produce to be processed in the packing facility is created within a central database (step 20). As used herein and in the appended claims, unless otherwise specifically denoted, the term "lot" will be used to refer to a particular batch or quantity of produce of the same kind that is taken to the packing facility to be processed. The lot ID may include any number of characters as best serves a particular application.

The central database used in connection with the process of FIG. 3 may be created within any database application as best serves a particular application. Exemplary database applications that may be used include, but are not limited to, Fox-Pro™, Structured Query Language (SQL), and Microsoft™ Access™.

In some examples, the lot ID is linked within the central database to one or more lot attributes. For example, the lot ID may be linked to digital photographs of the grower of the produce, the field where the lot of produce is grown, and the packing facility where the lot of produce is processed. Text describing the grower, field, packing facility, and/or third party audits of the produce may be additionally or alternatively be linked to the lot ID. The text may include, but is not limited to, the name of the grower, global positioning satellite (GPS) coordinates of the field, seed variety information, a description of the packing facility, and/or any other applicable information.

As mentioned, text describing third party audits of the produce may additionally or alternatively be linked to the lot ID. Third party audits allow end customers to verify that the grower or shipper is using "good agricultural practices" and "good handling practices." The audits may be performed by any third party, e.g., Primus Labs.

As shown in FIG. 3, the lot of produce corresponding to the lot ID is then taken into the packing facility to be processed (step 21). A tracking ID may then be assigned to the incoming lot within the central database (step 22). As will be described in more detail below, the tracking ID may be used anywhere in the supply chain to trace the lot of produce back to the packing facility and to the field in which the lot of produce was grown.

In some examples, the tracking ID is referred to as a run number and includes the date and order in which the lot is processed in the packing facility. For example, if the lot is the first lot to be processed in the packing facility on April 18 of a given year, it may be assigned a tracking ID of Apr. 18, 2001.

In some examples, the tracking ID may additionally or alternatively include a USDA positive lot identification (PLI) number. USDA PLI numbers are issued by the USDA to inspected lots of produce and are used to trace produce that is in commerce back to its packing facility. In some examples, the USDA PLI number is linked to the lot ID within the central database so that it may also be used to trace the produce back to the field in which it was grown.

In some alternative examples, both a run number and a USDA PLI number are assigned to an incoming lot of produce. A separate run number is advantageous in some instances because it may be easier for workers in the packing facility to work with run numbers rather than USDA PLI numbers. However, it will be recognized that run numbers and USDA PLI numbers are merely illustrative of the many different types of tracking numbers that may be assigned to an incoming lot of produce.

Figure 4:
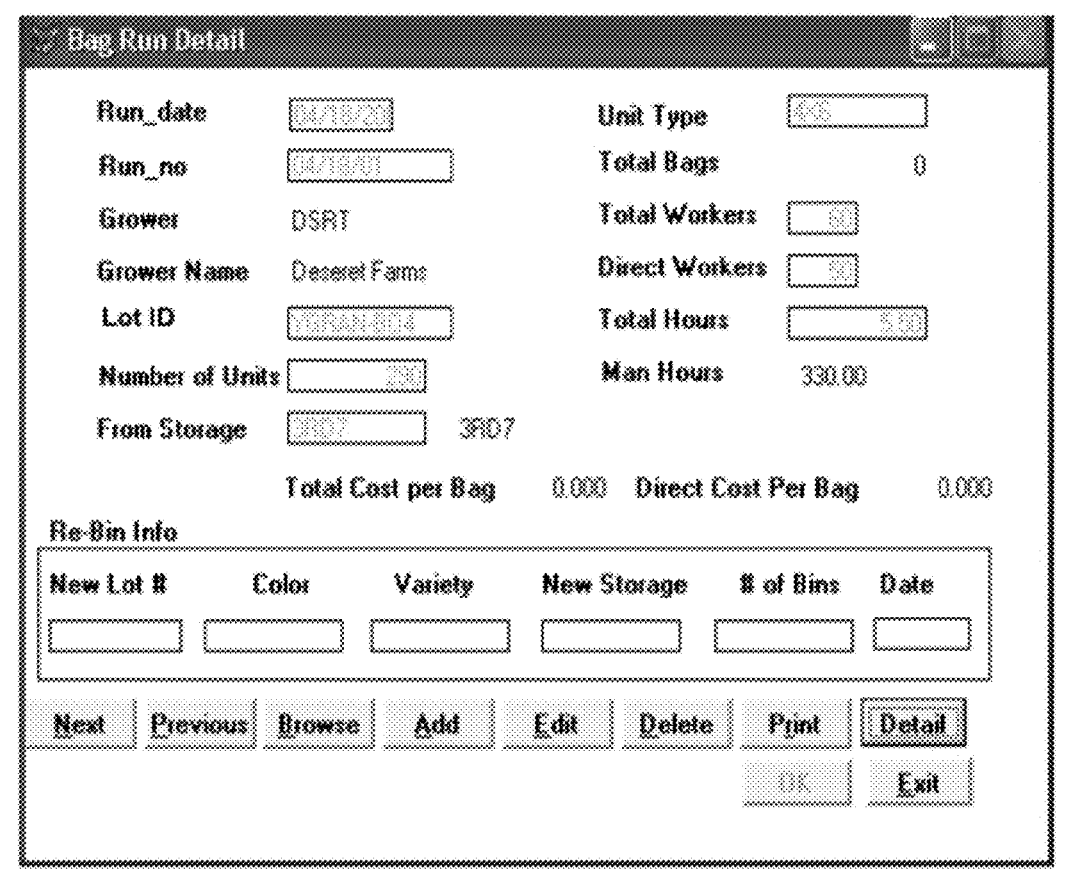

FIG. 4 is a screen shot of an exemplary software program that may be used by a packing facility worker to assign a tracking ID to an incoming lot of produce within the central database. As shown in FIG. 4, the packing facility worker may be presented with a number of additional input fields for each lot of produce processed. For example, the worker may additionally enter the date, lot ID, and/or various details regarding the particular lot of produce being processed.

Returning to FIG. 3, the lot of produce is then processed (step 23). As mentioned, the produce may be processed in a variety of different manners. For example, the produce may be cleaned, waxed, sized, quality graded, and/or sorted.

After the produce has been processed, it is packaged into containers (step 24). Once packaged, random samples of the produce within the lot are inspected by an inspector (step 25). As mentioned, the inspector may be an internal inspector hired by the packing facility. Alternatively, the inspector may be a government inspector assigned to the packing facility. A number of different qualities of the produce may be inspected depending on the particular type of produce being processed. For example, the inspector may ensure that the produce has been properly sorted and labeled by weight, color, quality, and/or grade.

Figure 5:
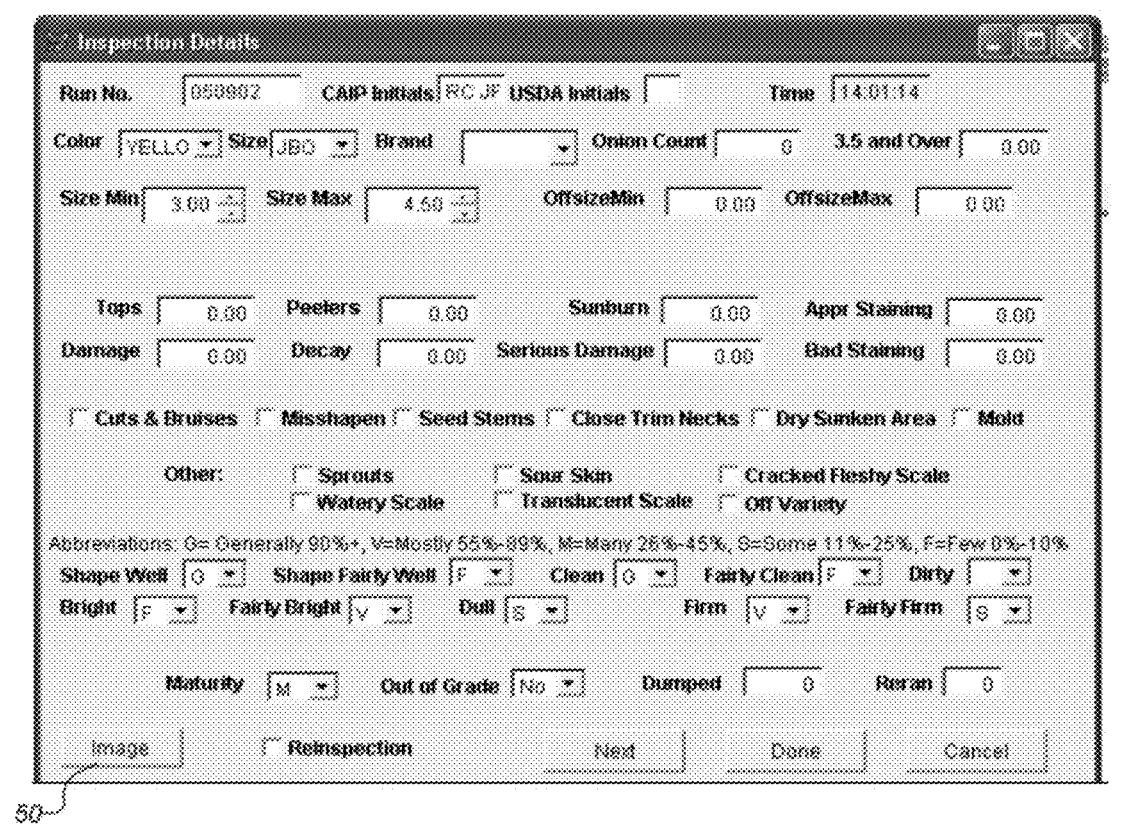

In some examples, the inspector enters an inspection report into a software program that is linked to the central database. In this manner, the inspection report may be linked to a particular tracking ID within the central database. For example, FIG. 5 is a screen shot of an exemplary produce inspection software program that may be used by an inspector to enter an inspection report into the central database. As shown in FIG. 5, the program allows the inspector to enter the tracking ID of the inspected samples; information identifying the inspector; and information corresponding to the brand, weight, color, quality, and/or grade of the produce. In some examples, the software program automatically date and time stamps the entry made by the inspector.

Returning to FIG. 3, a digital photograph of one or more samples within the lot of produce may also be taken (step 26). In some examples, the first sample within the lot of produce that is processed is photographed. Additionally or alternatively, one or more of the samples that are inspected are photographed. The photographs may then be stored and linked within the central database to the tracking ID.

Figure 6:
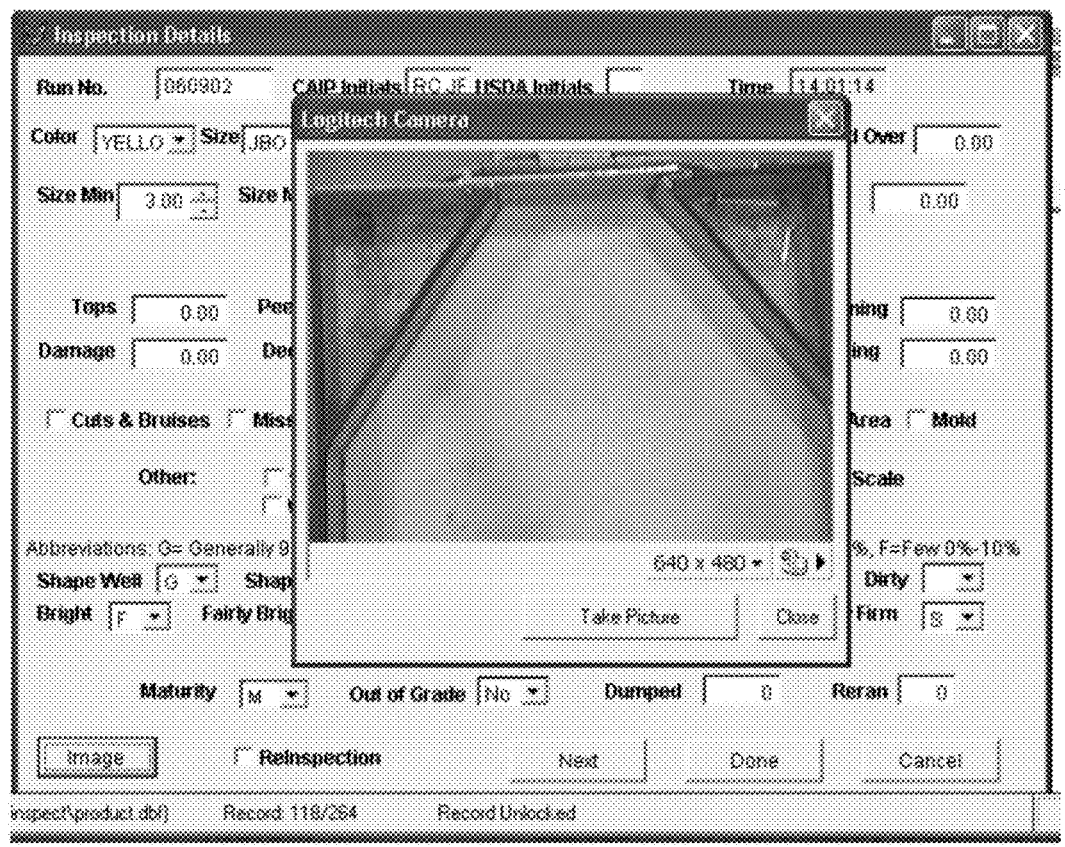
FIG. 6 is a screen shot illustrating an exemplary program that may be used to take digital photographs of the produce according to principles described herein.

In some examples, the camera that is used to take the digital photographs of the produce is controllable via a computer software interface. For example, as shown in FIG. 5, the software program used to inspect the produce may also include a button (50) that may be selected to activate a program that is used to take the digital photographs. FIG. 6 is a screen shot illustrating an exemplary program that may be used to take digital photographs of the produce.

In some examples, digital video of one or more samples within the lot of produce may additionally or alternatively be taken and linked to the tracking ID. For example, digital video may record some or all of the processing of a particular sample of produce in the packing facility.

Returning to FIG. 3, the containers are then marked with the tracking ID and/or other desirable information (e.g., lot and quantity information) (step 27). In some examples, the marking includes a bar code, radio frequency ID, or any other tagging system identifier.

In some examples, the marking information is printed on a tag that is affixed to each container. Additionally or alternatively, the marking information may be stamped or otherwise printed directly on each container.

In some examples, the marking information is affixed directly to each piece of produce within an order (e.g., a sticker is affixed to each piece of fruit within an order). However, it will be recognized that in some instances, it is too labor intensive to mark each individual piece of produce or even each individual container within an order. Hence, the marking information may alternatively be affixed to one or more pallets of containers in a particular order.

The containers of produce may then be loaded onto a transport vehicle (e.g., a truck, ship, airplane, etc.) (step 28) and transported to one or more buyers who have placed orders for various quantities of produce. Each order is assigned a purchase order (PO) number within the central database.

In some examples, the tagging system identifier (e.g., the bar code) corresponding to the containers in a particular purchase order is scanned into the central database as the containers are loaded onto the transport vehicle to fulfill the purchase order. In this manner, the purchase order number may be linked to the tracking ID within the central database. Additional information, such as the quantity of produce included within the shipment, may also be linked to the tracking ID within the central database.

After a Bill of Lading is completed with the operator of the transport vehicle, the order may then be finalized by a shipping clerk within the central database. In this manner, as will be described in more detail below, a customer may see via the Internet that his or her order has shipped almost as soon as the produce is loaded onto the transport vehicle.

Figure 7:
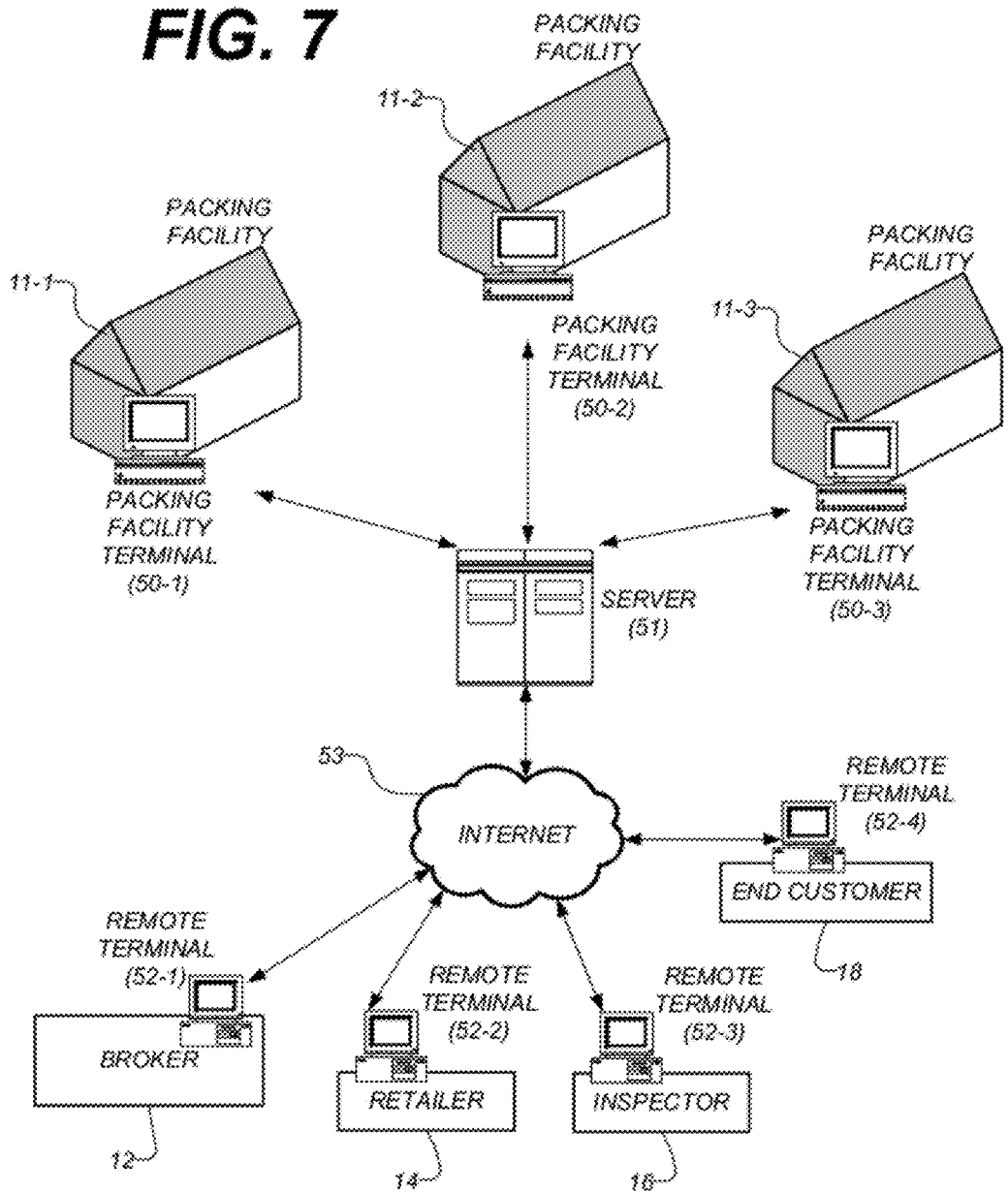
FIG. 7 illustrates an exemplary system whereby a customer may access information regarding a pending or already placed produce order via the Internet or any other type of networking configuration according to principles described herein.

FIG. 7 illustrates an exemplary system whereby a customer may access information regarding a pending or already placed produce order via the Internet or any other type of networking configuration. The information may include, but is not limited to, sales, shipping, tracing, inspection, and other load information. As shown in FIG. 7, a packing facility terminal (50) may be located at a number of different packing facilities (11-1 through 11-3). Information regarding the production, processing, and inspection of an order of produce at each packing facility (11) is entered into the central database using the packing facility terminals (50) as described above in connection with FIGS. 3-6. This information is stored on a central server (51) which may also be located at any suitable location. The server (51) is connected to the Internet (53) or any other suitable network.

As shown in FIG. 7, any authorized customer or other entity that is also connected to the Internet (53) may access the information stored on the server (51). For example, a broker (12) may access the information stored on the server (51) using remote terminal (52-1), a retailer (14) may access the contents of the server (51) using remote terminal (52-2), an inspector (16) may access the contents of the server (51) using remote terminal (52-3), and/or an end customer (18) may access the contents of the server (51) using remote terminal (52-4).

It will be recognized that the information entered at each packing facility (11) may alternatively be stored in separate databases residing at the packing facilities (11). Information stored in these separate databases may be accessed by querying each separate database instead of querying a central database. In some alternative examples, the information may be stored on separate databases residing at the packing facilities (11) and in a central database located at the server (51). In this manner, desired information may be accessed by querying the packing facility databases directly or by querying the central database.

Each of the terminals (50, 52) shown in FIG. 7 may include any suitable computing device configured to be connected to the Internet (53). For example, the terminals (50, 52) may include, but are not limited to, personal computers, personal digital assistants (PDAs), and cellular phones. In some alternative examples, a customer without a connection to the Internet (53) may access information regarding a produce order by using an automated telephone system.

As mentioned, an authorized customer may access the information stored on the server (51) via a web-based application. In some examples, the contents of the web-based application are continuously updated with the contents of the database so that the information seen on the web-based application is always current. In some alternative applications, the contents of the web-based application are updated periodically as best serves a particular application.

In some examples, the web-based application is maintained by a produce facility, broker, or other entity. The customer may be given a username and password and may then login and view information specific to his or her produce order. An exemplary web-based application configured to provide information regarding a produce order will now be described. It will be recognized that the web-based application described herein is merely illustrative of the many different web-based applications that may be used to provide access to information regarding a produce order to a customer or to any other authorized entity.

Figure 8:
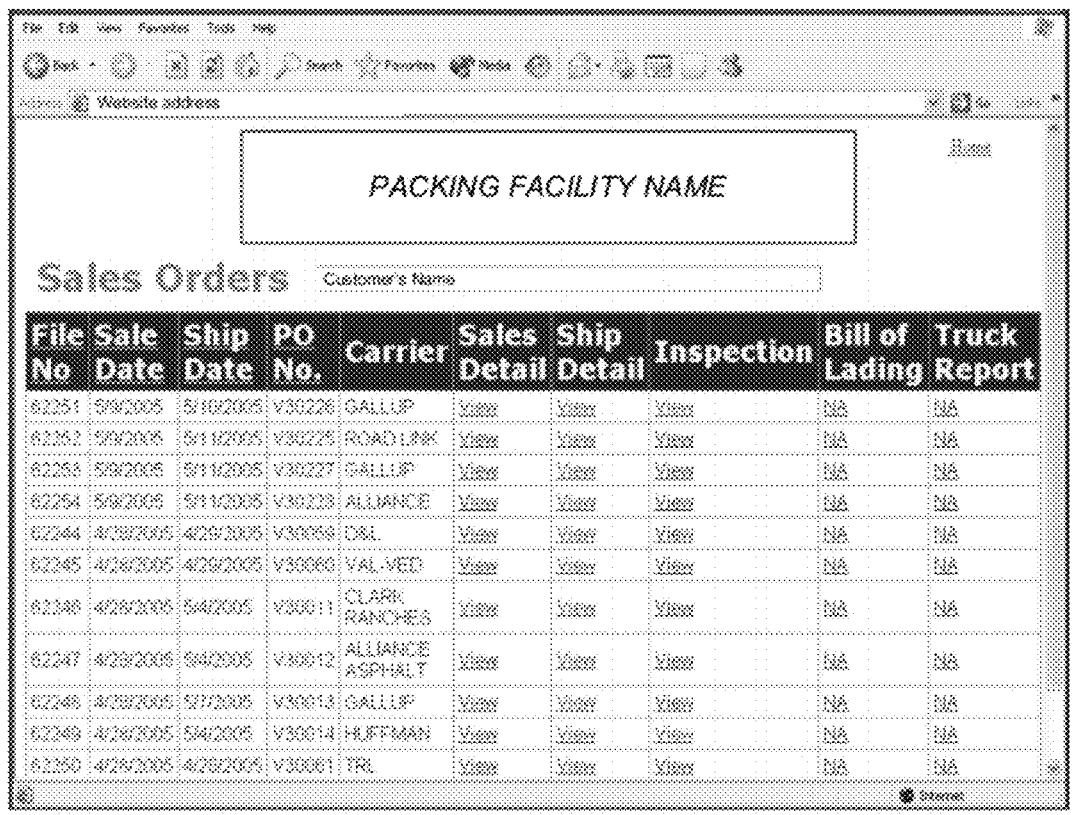
FIG. 8 is a screen shot illustrating a sales orders summary web page that appears after a customer logs on to the web-based application according to principles described herein.

FIG. 8 is a screen shot illustrating a sales orders summary web page that appears after a customer logs on to the web-based application. As shown in FIG. 8, the web page gives a summary of all the customer's sales orders within a given time frame. Each sales order includes a file number (a number assigned to the order by the central database), a sales date, a ship date, a purchase order (PO) number, the name of the transport carrier, a link to view the order's sales details, a link to view the order's shipping details, a link to view the inspection report summary corresponding to the order, a link to view the Bill of Lading corresponding to the order, and a link to view a report of the transport vehicle (e.g., a truck). In some examples, the customer may sort the information shown in the sales orders web page by file number, sale date, ship date, or PO number.

In some examples, the customer may desire to view detailed information regarding a particular order. For example, the customer may desire to view the inspection report summary corresponding to the order having the file number of 62247. To do so, the customer selects the "View" link under the "Inspection" heading corresponding to the file number 62247. Upon selecting the "View" link, a detailed inspection report summary may appear on the screen.

Figure 9:
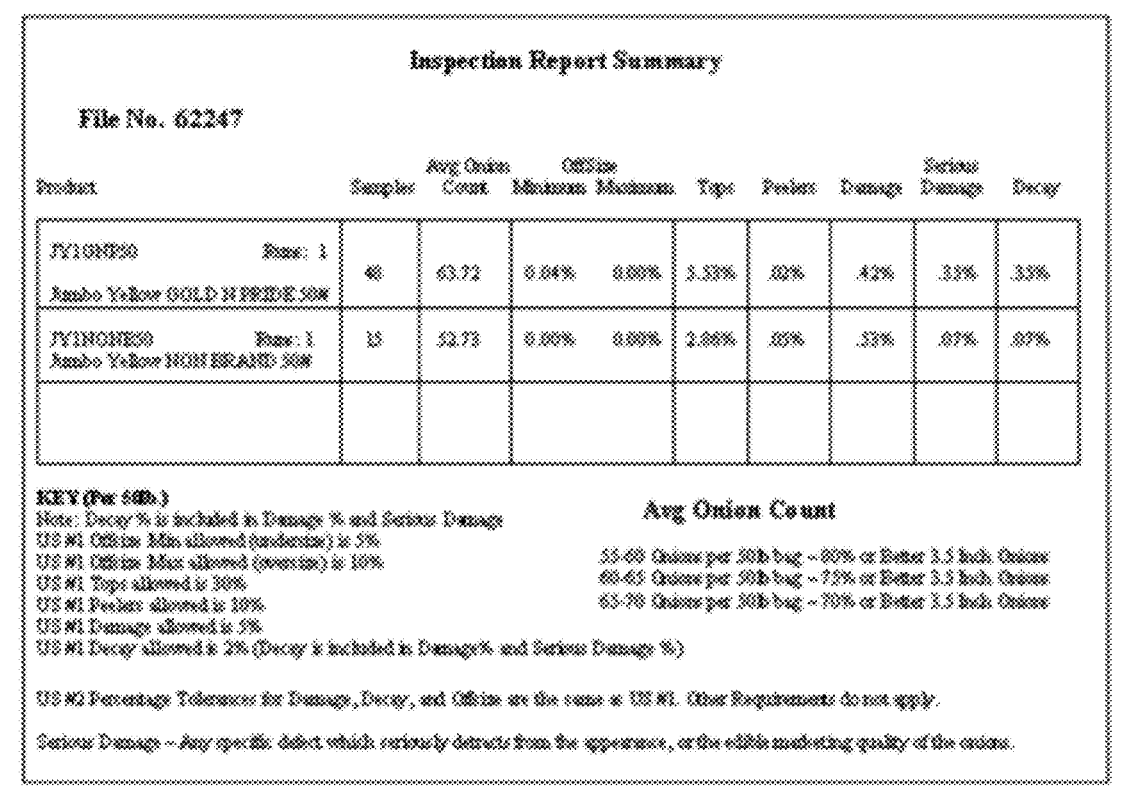

FIG. 9 is a screen shot of a web page showing an exemplary inspection report summary. As shown in FIG. 9, the inspection report summary may include information regarding the inspection of all the different brands or products within the selected order and is derived from the information entered into the central database by the inspector at the packing facility. The inspection report summary shown in FIG. 9 corresponds to an order of onions for illustrative purposes only. It will be recognized that the information included within the inspection report summary may vary depending on the contents of the order and the information provided by the inspector.

In some examples, the customer may desire to view the details regarding the inspection of a specific sample of produce within the order. Hence, a link (not shown) to the full inspection notesheets that are averaged together to obtain the inspection report summary of FIG. 9 may also be included on the web page shown in FIG. 8. By selecting this link, an image of a full inspection notesheet may appear on the screen. The contents of the full inspection notesheet may vary as best serves a particular type of produce being inspected.

Returning to FIG. 8, the customer may alternatively desire to view the sales details for a particular order of produce (e.g., file number 62247). To do so, the customer may select the "View" link under the "Sales Detail" heading corresponding to the file number 62247. Upon selecting the "View" link, a sales details summary for the selected order appear on the screen.

Figure 10:
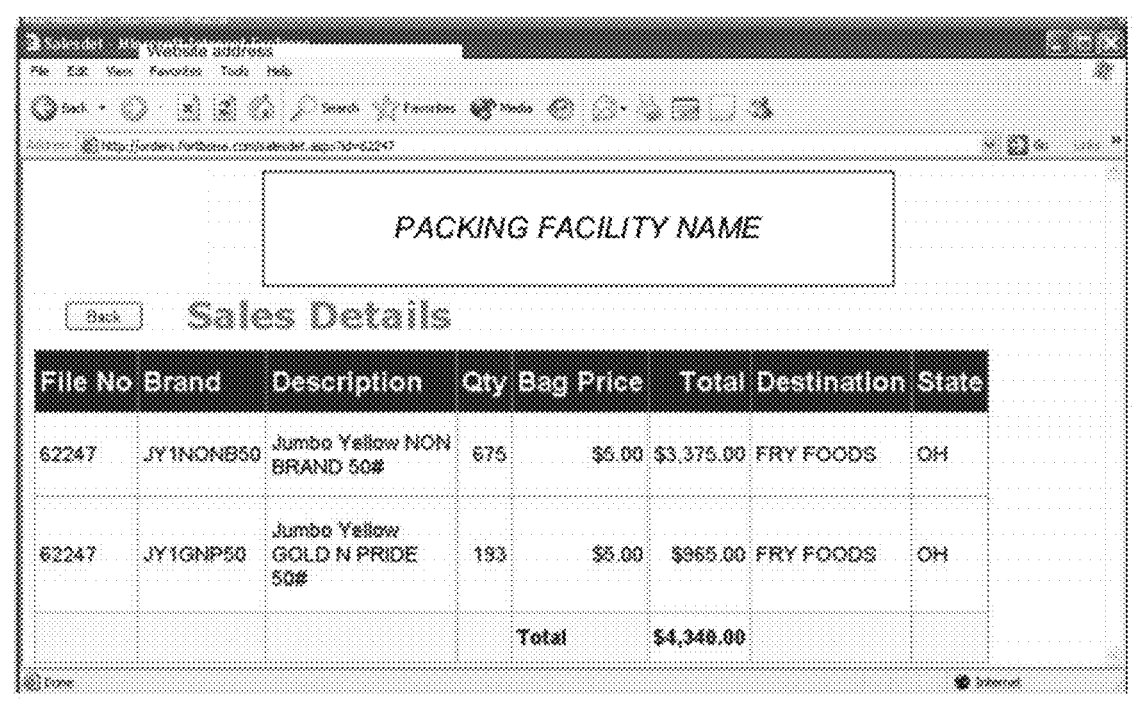

FIG. 10 is a screen shot of a web page showing an exemplary number of sales details corresponding to a selected order. As shown in FIG. 10, the sales details summary may show the name of each brand of produce included within the order and description, quantity, pricing, and shipping destination information for each of the brands included within the order.

For example, as shown in FIG. 10, the order having the file number 62247 includes two different brands of onions. The first brand is called JY1NONB50 and the second brand is called JY1GNP50. The order includes 675 bags of the first brand at $5.00 per bag and 193 bags of the second brand at $5.00 per bag for a total purchase price of $4,340.00. Each brand is destined for "Fry Foods" in Ohio.

Once an order has been entered into the central database, its corresponding sales details are available to be seen via the web-based application. Hence, in some examples, the customer may access the sales details of an order before it is shipped to verify that the order is correct.

It will be recognized that the web page configuration shown in FIG. 10 is merely illustrative of the many different web page configurations that may be used to show the sales details for a particular order. The sales details may include additional or alternative information as best serves a particular customer or type of produce.

Returning to FIG. 8, the customer may alternatively desire to view the shipping details of a particular order (e.g., file number 62247). To do so, the customer may select the "View"

link under the "Ship Detail" heading corresponding to the file number 62247. Upon selecting the "View" link, the shipping details of the selected order appear on the screen.

Figure 11:
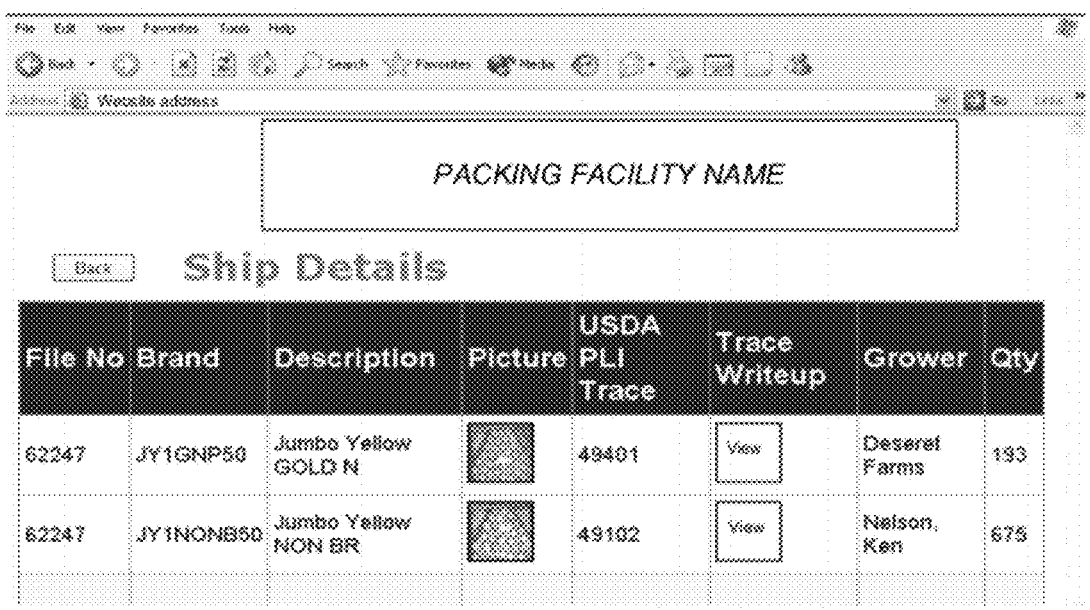
FIG. 11 is a screen shot of a web page showing an exemplary number of shipping details of a particular order according to principles described herein.

FIG. 11 is a screen shot of a web page showing an exemplary number of shipping details of a particular order. As shown in FIG. 11, the shipping details web page may show a digital picture of one or more samples of each brand of produce within the selected order, a tracking number (e.g., the USDA PLI number) for each of the brands within the order, and quantity information for each of the brands within the order.

For example, as shown in FIG. 11, the customer may see that the brand labeled as JY1GNP50 has a USDA PLI number of 49401 and was grown at Deseret Farms. Likewise, the brand labeled as JY1NONB50 has a USDA PLI number of 49102 and was grown by Ken Nelson.

It will be recognized that the shipping details web page configuration shown in FIG. 11 is merely illustrative of the many different web page configurations that may be used to show the shipping details of a particular order. The web page may include additional or alternative information as best serves a particular customer or type of produce. For example, the shipping details web page may include link to a digital video of the produce being processed and/or inspected within the packing facility.

shipping details web page of FIG. 11 may additionally or alternatively include a link to another web page that shows additional tracing information corresponding to each of the brands of produce within the order. To view this tracing information, the customer may select the "View" link under the "Trace Write-up" heading. Upon selecting the "View" link, a detailed description of the field, grower, and/or packing facility may be shown.

Figure 12:
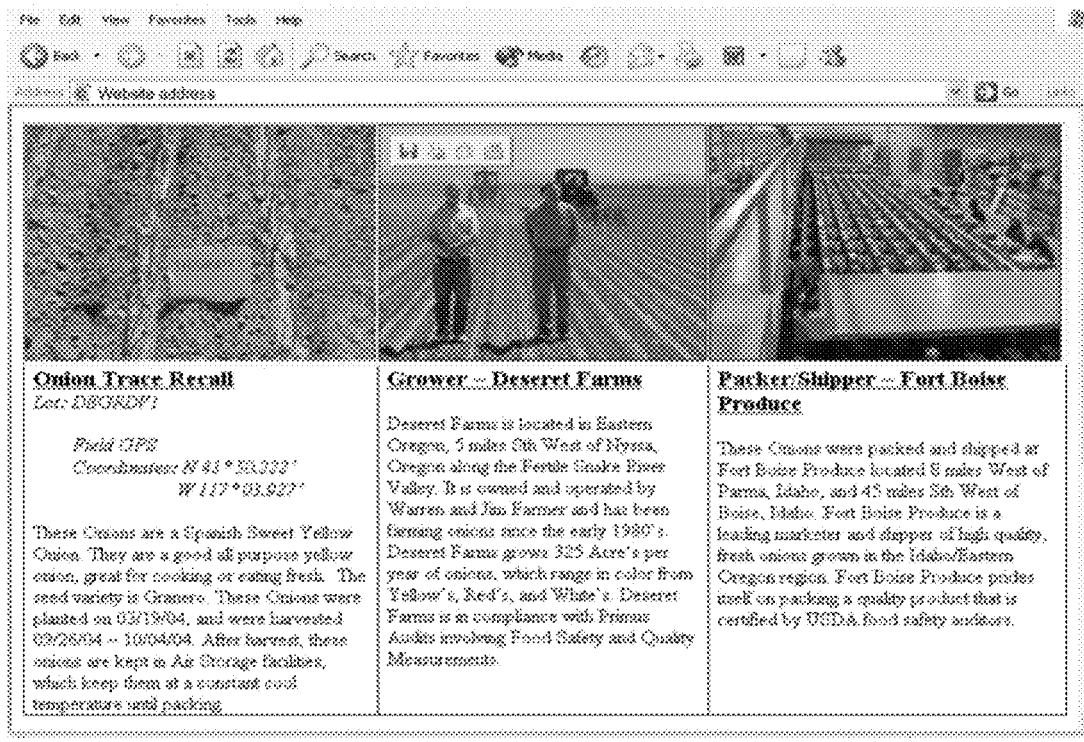
FIG. 12 is a screen shot of a web page showing exemplary tracing information corresponding to a particular order of produce according to principles described herein.

FIG. 12 is a screen shot of a web page showing exemplary tracing information corresponding to a particular order of produce. As shown in FIG. 12, the tracing information may include a picture and/or description of the field in which the produce within the order was grown. The description of the field may include the GPS coordinates of the field and/or a link to an online mapping service showing the field (e.g., Google Earth™). The description of the field may additionally or alternatively include a description of the particular produce grown in the field, the lot ID of the produce grown in the field, and details regarding the planting and harvesting of the produce.

As shown in FIG. 12, the tracing information web page may additionally or alternatively include a picture and/or description of the grower of the produce. The tracing information web page may additionally or alternatively include a picture and/or description of the packing facility where the selected order of produce was processed.

It will be recognized that the tracing information web page configuration shown in FIG. 12 is merely illustrative of the many different web page configurations that may be configured to show tracing information such as descriptions of the field, grower, and packing facility corresponding to the produce in a particular order. The summary may include additional or alternative information as best serves a particular customer or type of produce such as, but not limited to, Lot IDs and seed variety information.

In some examples, some or all of the information shown in any of the web pages of FIGS. 8-12 may be customized, reformatted, and/or omitted for a particular customer. For example, a broker may desire to restrict access to pricing information regarding a particular order for end customers (e.g., retailers). In this example, the sales details web page shown in FIG. 10 may be configured to hide pricing information and only show quantity information for each brand of produce within an order when accessed by an end customer.

Hence, the web-based application described in connection with FIGS. 8-12 may be used to quickly access information at any point along the supply chain corresponding to all of the produce that is processed in one or more packing facilities. The information may be sorted and viewed by packing facility, lot ID, tracking ID, USDA PLI number, customer, drop location, broker, field, grower, inspector, inspection results, harvest date, processing date, packing date, shipping date, shipping company, price, quantity, brand, type of produce, or by any other category as desired.

Moreover, the web-based application described in connection with FIGS. 8-12 may be used to standardize the various tracing methods used by different packing facilities. In other words, all the information is input into the central database in the same manner in each packing facility. In this manner, every entity throughout the supply chain may be able to access the same information regarding specific orders of produce, specific packing facilities, specific growing fields, etc.

In some examples, the web-based application described herein may also be used by a government inspector to ensure that proper procedures are followed by on-site inspectors. The government inspector may be a state or federal inspector. The government inspector may access and sort inspection summaries by packing facility, customer, order number, on-site inspector name, product, brand, date, etc. The web-based application saves the government inspector considerable time and resources by allowing him or her to access the information via the Internet.

For example, a government inspector may desire to access information regarding inspections of specific samples of produce within a lot of produce that is processed at a particular packing facility. If all the packing facilities use the present systems and methods to input processing and inspection information into the central database, the government inspector may use the web-based application to quickly access the desired inspection information, regardless of the packing facility where the produce was processed.

The web-based application described herein may also be used by a government agent to trace a product back to its corresponding packing facility and/or field where it was grown. For example, if a certain product in a particular grocery store is found to be contaminated, a government agent may quickly determine where the product was grown and where it was processed prior to shipping by using the tracking number (e.g., the USDA PLI number) to query the web-based application to display tracing information corresponding to the product. If it is determined that the contamination occurred at the packing facility, for example, the government agent may then use the web-based application to quickly determine the location of all other produce processed at that packing facility so that the produce may also be tested, quarantined, or otherwise dealt with. In this manner, acts of bioterrorism, contamination, or any other problem associated with produce may be quickly remedied.

In some examples, the produce is additionally or alternatively inspected at a receiving point (e.g., at the broker's place of business or at the retailer's place of business). For example, the federal government has recently established the Fresh Electronic Inspection Reporting/Resource System (FEIRS), which includes an electronic means of recording the inspection summaries prepared by the receiving point inspectors. In some examples, the results of these receiving point inspections are linked to the tracking ID of the produce. In this manner, the receiving point inspection results may also be accessed by customers.

It will be recognized that the web-based application described herein may additionally or alternatively be used to access any other type of information corresponding to produce that is processed in one or more packing facilities. For example, a grower may use the web-based application to access packout and/or inventory information regarding produce that he or she grows or otherwise produces. Such packout and/or inventory information may include, but is not limited to, bin reports, packout reports, lot reports, and truck reports. These reports may allow the grower to view how his or her produce is being inspected, processed, and shipped. They may also allow the grower to calculate an expected return on investment due to the packing performance of his or her produce. Web pages may be designed that allow access to such information as best serves a particular application.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A computer-implemented method for allowing a customer to access information related to a commodity, said computer-implemented method comprising:
    providing a central database on an electronic storage medium;
    receiving, by a server communicatively coupled to said central database, said information related to said commodity;
    entering, by said server, said information from said server into said central database;
    allowing, by said server, said customer to access said information via said server using a web-based application running on a remote terminal;
    wherein said information comprises inspection information corresponding to said commodity and at least one or more of sales information, shipping information, packout information, inventory information, and tracing information corresponding to said commodity;
    transmitting, by said server, to said web-based application running on the remote terminal original source location information of said commodity;
    transmitting, by said server, to said web-based application running on the remote terminal a photograph of an origin of said commodity; and
    linking, by said server, at least one tracking identification (tracking ID) of said commodity to said information, said original source location information, and said photograph of said origin of said commodity, wherein said information, said original source location information, and said photograph are stored in said central database.

2. The computer-implemented method of claim 1, wherein said original source location information includes a map of said original source location.

3. The computer-implemented method of claim 1, wherein said original source location comprises at least one or more of a field, a farm, a grower, and a packing facility.

4. The computer-implemented method of claim 1, wherein said commodity comprises a food product.

5. The computer-implemented method of claim 4, wherein said food product comprises at least one or more of a produce, grain, or meat.

6. The computer-implemented method of claim 1, wherein said step of receiving, at a server communicatively coupled to said central database, said information related to a commodity comprises:
    assigning said tracking identification (tracking ID) to a lot of said commodity, said lot of said commodity having a common original source location and harvest date;
    wherein said customer uses said tracking ID to access said information via said web-based application.

7. The computer-implemented method of claim 1, wherein said tracking ID comprises at least one of a bar code, a radio frequency ID, or a tagging system identifier.

8. The computer-implemented method of claim 1, wherein said information further comprises one of audit information about said commodity, inspection information about said commodity, and certification information about said commodity.

9. The computer-implemented method of claim 1, wherein said tracing information comprises a photograph of said inspected commodity and a photograph of a packing facility wherein said commodity is processed.

10. The computer-implemented method of claim 1, wherein said tracing information comprises a photograph of a grower of said commodity, text describing said original source location, text describing said grower of said commodity, and text describing said packing facility.

11. A system for allowing a customer to access information related to a commodity, said system comprising:
    a server configured to store said information in a central database, said information comprising inspection information corresponding to said commodity and at least one or more of sales information, shipping information, packout information, inventory information, and tracing information corresponding to said commodity;
    said server configured to link a tracking identification (tracking ID) of said commodity to said information and to a photograph of an origin of said commodity;
    said server further configured to transmit the photograph of the origin of said commodity to a web-based application;
    one or more terminals having one or more applications configured to enter said information and said photograph into said central database; and
    the web-based application configured to display said photograph and allow said customer to access said information within said central database.

12. The system of claim 11, wherein said commodity comprises at least one or more of a produce, grain, meat, a food item, and livestock.

13. The system of claim 11, wherein one or more tracking identification (tracking ID) numbers are linked to said commodity, wherein said tracking ID numbers are used by said customer to access said information.

14. A system for tracing a lot of a commodity to its original source location, said system comprising:
    a server configured to store tracing information in a central database on an electronic storage medium, said tracing information comprising information describing said original source location of said commodity and a photograph of an origin of said commodity;
    a first terminal having an application configured to link said tracing information within said central database to a United States Department of Agriculture positive lot identification number (USDA PLI number) corresponding to said lot of said commodity; and
    a second terminal configured to display said tracing information by querying said central database via a web-based application, wherein said second terminal is configured to display said original source location of said commodity and said photograph of said origin of said commodity.

15. The system of claim 14, wherein said commodity comprises produce and said source comprises a field in which said produce is grown.

16. The system of claim 14, wherein said commodity comprises at least one or more of a produce, grain, meat, and livestock.

17. A computer program product for providing a customer access to information related to a commodity, the computer program product comprising a non-transitory computer-readable medium having instructions thereon, the instructions comprising:
 code programmed to receive said information related to a commodity;
 code programmed to enter said information into a central database on an electronic storage medium, wherein said information includes:
 inspection information corresponding to said commodity and at least one or more of sales information, shipping information, packout information, inventory information, and tracing information corresponding to said commodity;
 code programmed to link a tracking identification (tracking ID) of said commodity to said information and to a photograph of an origin of said commodity;
 code programmed to allow a customer to access said information and said photograph in said central database via a web-enabled terminal; and
 code programmed to transmit to said web-enabled terminal the photograph of the origin of said commodity.

18. The computer program product of claim 17, further comprising:
 code programmed to generate a number of web pages configured to display said information related to said commodity in response to an access request by said customer via said web-enabled terminal.

19. The computer program product of claim 17, wherein said commodity comprises at least one or more of a produce, grain, meat, and livestock.

* * * * *